(12) United States Patent
Morovic et al.

(10) Patent No.: US 11,265,442 B2
(45) Date of Patent: Mar. 1, 2022

(54) PRINT PROPERTY CONTROL BY GENERATING PRINT COLOR MAPPING AS CONVEX COMBINATION OF COLOR MAPPING DATA ASSOCIATED WITH INKS AND CHARACTERIZED BY DESIRED COLOR PROPERTIES

(71) Applicant: HEWLETT-PACKARD DEVELOPMENT COMPANY, L.P., Spring, TX (US)

(72) Inventors: Peter Morovic, Sant Cugat del Valles (ES); Jan Morovic, London (GB); Javier Maestro Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/498,594

(22) PCT Filed: May 15, 2018

(86) PCT No.: PCT/US2018/032795
§ 371 (c)(1),
(2) Date: Sep. 27, 2019

(87) PCT Pub. No.: WO2019/221711
PCT Pub. Date: Nov. 21, 2019

(65) Prior Publication Data
US 2021/0360122 A1   Nov. 18, 2021

(51) Int. Cl.
*H04N 1/40* (2006.01)
*H04N 1/54* (2006.01)
(Continued)

(52) U.S. Cl.
CPC .......... *H04N 1/40006* (2013.01); *H04N 1/54* (2013.01); *H04N 1/6019* (2013.01); *H04N 1/6063* (2013.01); *H04N 1/626* (2013.01)

(58) Field of Classification Search
CPC ................................................. H04N 1/46–628
See application file for complete search history.

(56) References Cited

U.S. PATENT DOCUMENTS

| 5,734,800 A | 3/1998 | Herbert et al. |
| 6,205,246 B1 * | 3/2001 | Usami ................. H04N 1/6052 358/1.9 |

(Continued)

FOREIGN PATENT DOCUMENTS

| EP | 1043164 B1 | 10/2000 |
| EP | 1894737 A2 | 3/2008 |
| GB | 2386811 B | 9/2003 |

*Primary Examiner* — Scott A Rogers
(74) *Attorney, Agent, or Firm* — HP Inc. Patent Department (57) ABSTRACT

Certain examples relate to configuring a print processing system to produce rendered color outputs based on desired properties of said outputs using resources available to the print processing system. In these examples, print job data is received comprising image data and print property data. Color mapping data is configured to produce print mapping data based on at least the print property data. Print instructions for an image rendering device are generated based on the print mapping data. The print properties may be selectable by a user. Color mapping data may be characterized by color properties.

15 Claims, 5 Drawing Sheets

(51) Int. Cl.
*H04N 1/62* (2006.01)
*H04N 1/60* (2006.01)

(56) References Cited

U.S. PATENT DOCUMENTS

| | | |
|---|---|---|
| 6,712,449 B2 | 3/2004 | Smith |
| 7,177,047 B2 * | 2/2007 | Rozzi .................. H04N 1/6016 358/1.9 |
| 8,270,032 B2 | 9/2012 | Benedicto et al. |
| 8,492,060 B2 | 7/2013 | Choi et al. |
| 8,936,893 B2 | 1/2015 | Tyagi et al. |
| 2004/0209096 A1 | 10/2004 | Brehm et al. |
| 2006/0082844 A1 | 4/2006 | White |
| 2013/0038719 A1 | 2/2013 | Canini et al. |
| 2016/0125269 A1 | 5/2016 | Lee et al. |

\* cited by examiner

PRINT PROPERTY CONTROL BY GENERATING PRINT COLOR MAPPING AS CONVEX COMBINATION OF COLOR MAPPING DATA ASSOCIATED WITH INKS AND CHARACTERIZED BY DESIRED COLOR PROPERTIES

BACKGROUND

Image rendering devices such as printers may be used to render an image onto a print medium by depositing a printing fluid such as ink. An image may be received as digital data, where the digital data indicates color values in an input color space for pixels of the image. For example, an image has a first number of pixels in an x-direction and a second number of pixels in a y-direction, where each pixel has a value in a Red, Green Blue (RGB) color space. In a simple 16 bit representation, each pixel may be represented as a triple or tristimulus value, e.g. three variables in the range 0-255 such as (125, 76, 12). To render the image, the image rendering device needs to represent the digital data in a color space that is appropriate for the available printing fluids. For example, a printer may have four inks: Cyan, Magenta, Yellow and Black, and so print data may be represented in a CMYK color space. In certain cases, a controller may control the printer such that discrete quantities of each of the four inks are deposited at a print resolution. To convert from an input color space to a print color space, a color mapping may be used. The color mapping may be direct, e.g. from a RGB color space to a CMYK color space, or may be indirect, e.g., from a RGB color space to a CMYK color space via intermediate color spaces. The color mapping thus determines the appearance of the rendered image.

BRIEF DESCRIPTION OF THE DRAWINGS

Various features of the present disclosure will be apparent from the detailed description which follows; taken in conjunction with the accompanying drawings, which together illustrate features of the present disclosure, and wherein.

DETAILED DESCRIPTION

Rendered color outputs produced in printing systems may be associated with color properties. In ink-based printing systems, the color properties of rendered color outputs may be dependent on the inks used to produce them. Examples of color properties may include lightfastness, gamut volume, and granularity of an image. Lightfastness is an indication of how resistant to fading or discoloration the inks on a rendered color output are when exposed to light. A rendered output is said to be lightfast if the image on it is not prone to discoloration or fading. Gamut volume, another color property, is a measure of the size of a gamut of colors, the gamut being a set of colors that are renderable by an image rendering device. For example, the gamut of a given inkjet printer may comprise the full range of colors that are reproducible by the printer on a given substrate. Gamut volume may be affected by the inks used, the printing technique employed, and/or the substrate onto which the inks are deposited to render the image.

There are often relationships between different color properties. For example, certain color property values may be dependent on other color property values. As an example, using an ink set with a large gamut volume may result in shorter lightfastness, that is to say the colors may fade more quickly. The desired color properties of a rendered color output may be dependent on the intended use for the rendered color output. Different users may favor the optimization of different properties. For example, some shop posters may be displayed in windows for long periods and so it is desired that they are lightfast and ink-efficiency may not be factored into the printing process. On the other hand, there may be less desire for longer lightfastness for a pamphlet that is to be used for a comparatively short period of time; in this case, greater ink-efficiency may be desired given the greater number of rendered outputs.

Certain examples described herein facilitate the production of rendered color outputs based on desired color properties. For example, color outputs may be produced that have an indicated or desired color property, while optimizing other color properties. These examples may be used where the nature of the rendered color outputs varies between print jobs yet the different print jobs are desired to be rendered by the same image rendering device. Described examples may be used to enhance the range of color property options which can be met by a print processing system without changing the resources used.

Certain examples described herein make use of a set of inks for rendering an image onto a substrate according to print instructions. The print instructions are generated by a controller according to a print mapping which maps between an input color space and an output color. The print mapping is generated by the controller and may be dependent on desired properties of the rendered output. The print instructions may instruct the image rendering device to use different ratios and quantities of ink according to the print mapping. The desired properties of the rendered output may be, for example, a desired lightfastness. By using a larger proportion of inks that are more lightfast, a rendered color output may be more lightfast. By using a color mapping that is appropriate to a desired color property, such as a desired lightfastness level, it is possible to mix inks whose lightfastness differs such that an intermediate lightfastness results, while optimizing other color properties such as gamut volume or graininess, e.g. maximizing gamut volume and minimizing graininess.

Certain examples described herein configure a print mapping based on desired color properties of the rendered output. Color mapping data may be associated with color properties wherein at least some of the color mapping data may be characterized by a measurement of samples of rendered color outputs. The characterization of the print mapping data may be based on a relation between color properties and color mapping data from the measured samples. Color properties of a measured sample may be dependent on the types of colorants used to generate the measured sample. For example, the use of fluorescent inks in generating samples may increase the gamut volume available. However, the use of fluorescent inks may reduce the lightfastness of the measured sample.

Figure 1:
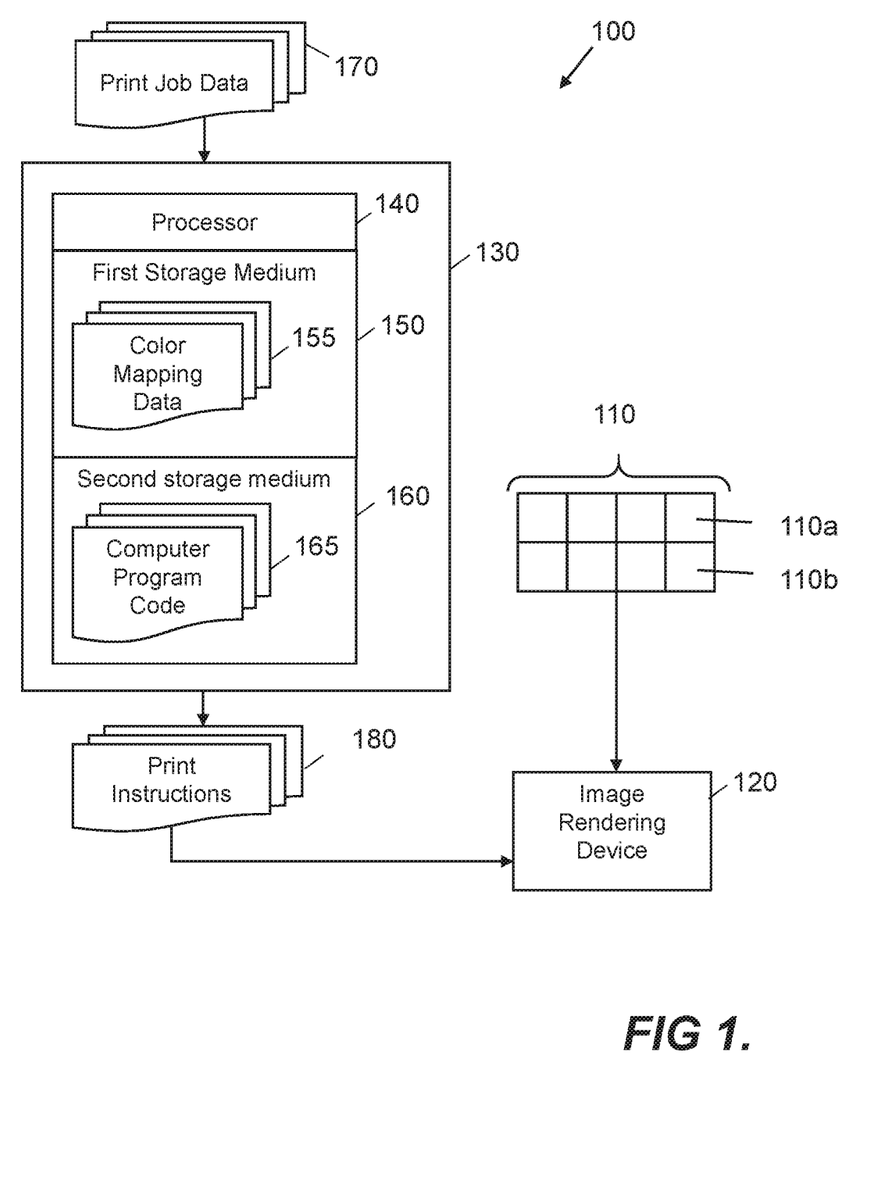
FIG. 1 is a schematic diagram of a print processing system according to an example.

FIG. 1 shows a print processing system 100 according to an example. The print processing system 100 is designed to use a set of inks 110 and comprises an image rendering device 120 to render an image onto a print medium using the set of inks 110, and a controller 130 to control the image rendering device 120. The image rendering device 120 may render the image onto the print medium by depositing inks from the set of inks 110 onto the medium. In an example, the image rendering device may be an inkjet printer configured to print images onto paper. Throughout this description it is acknowledged that the terms "printer" and "printing" may also apply to three-dimensional printing systems, for example where colored agents are deposited onto a bed of print material such as a bed of powdered polymer particles. The inks used to render the image may be deposited in a controlled manner. The set of inks 110 may comprise more than one color ink. An example of a set of inks used in an inkjet printer may include the colors Black, Cyan, Yellow, and Magenta. Different printing systems may use different ink colors to produce the gamut available to the respective printing system 100. The gamut is dependent on the inks used in a printing process where different colors in the gamut may be produced through different combinations of available inks. The gamut may be altered by altering the configuration of the printing system. In an example, altering the configuration of the printing system may include altering the inks available in a printing process. Producing colors from the available inks 110 may be done by halftoning, by mixing the inks directly, or by any other suitable printing technique.

An image rendering device 120 may deposit ink onto a print medium by using a printhead with a set of depositing nozzles. Inks 110 may be stored in chambers that form part of the printheads, in purpose-made canisters and/or in reservoirs in the print processing system. Each printhead may comprise a chamber storing a different ink, and the printhead may be replaced once the ink has been depleted. In some image rendering devices 120, one or more printheads are mounted above a media transport system so as to deposit ink onto the surface of a print medium carried by the media transport system. In certain cases, one or more printheads may be statically mounted across a width of a print medium (so-called "page width array" printers) and in other cases, one or more printheads may be mounted within a moveable carriage that scans across the width of a print medium. Depositing nozzles of the printheads may be arranged to deposit a combination of the available inks 110 to generate the image to be rendered. In a moveable carriage case, the print medium may be moved through the image rendering device 120 in one direction by the media transport system, which may comprise a belt or roller system, while printheads scan across the print medium in a perpendicular direction.

A print medium may also be considered a substrate or a base for a print job. In some examples, print media may include paper, textiles, plastics, or any other medium onto which inks can be deposited to render an image. In some examples, such as where the print medium is a paper or a textile material, the medium may be stored in a roll upstream in a production line for the image rendering device 120 and may be fed into the image rendering device 120. Once the image is deposited onto the print medium, the portion of the medium on which the image has been rendered may be separated from the roll for example, by cutting the medium. In other examples, the print medium may be fed into an image rendering device 120 as pre-cut segments larger than, the same size as, or smaller than, the image to be rendered. Where the pre-cut segments are smaller than the image to be rendered, a part of the image may be rendered on each segment and the image reconstructed later in a downstream process.

In the example of FIG. 1, the controller 130 comprises a processor 140, a first storage medium 150, and a second storage medium 160. The controller 130 may be implemented as a combination of hardware, such as control circuitry, and/or programming configured to perform the functionality described herein. In certain examples, the controller 130 may be located in proximity to the image rendering device 120; for example, the controller 130 and the image rendering device 120 may be physically as in a case where the controller 130 forms part of the image rendering device 120. In other examples, the controller 130 may be remotely located, e.g., the controller 130 and the image rendering device 120 may communicate through a communication channel, such as a network coupling. The processor 140 may be a standard central or graphical processing unit (CPU or GPU), or a custom processing unit designed for the purposes described herein. In certain cases, multiple processors may be provided, wherein each processor may have multiple processing cores.

In FIG. 1, the first storage medium 150 stores color mapping data 155 to map between an input color space associated with the image to be rendered and an output color space associated with the image rendering device 120. Colors in the input color space may be defined by vectors having a dimensionality set by the color space. The input color space may be an RGB-based color space, such as sRGB or Adobe RGB, or a device independent color space, such as CIEXYZ or CIELAB. The output color space may be a color space suitable for use in an image rendering device 120. The output color space may be dependent on the inks 110 available to the image rendering device 120. The inks 110 may also be considered colorants, where colorants include other types of substances such as dyes, pigments, or paints.

The output color space may be an area coverage space, such as an Neugebauer Primary area coverage (NPac) color space. An NPac color space recognizes that the colors producible by a set of inks may be dependent on the coverage areas of the inks. An NPac vector in the NPac color space represents a statistical distribution of Neugebauer Primaries (NPs) over an area of a halftone. In a simple binary printer, an NP may be one of $2^k-1$ combinations of k printing fluids within the printing system, or an absence of printing fluid (resulting in $2^k$ NPs in total). An NP may thus be seen as a possible output state for a print-resolution area. The set of NPs may depend on the configuration of a device in which they operate. This may include a dependence on the inks available, the printing levels (number of layers which can be applied, binary being the simplest), the drop volumes, drop numbers, etc. An example of a printing pipeline which may utilize an area coverage color space is a Halftone Area Neugebauer Separation (HANS) pipeline. A color mapping in this example may use a look-up table to map colorimetric values to vectors in an area coverage space.

The second storage medium 160 may store computer program code 165 that, when executed by the processor 140, causes the processor 140 to perform a number of operations. These operations include receiving print job data 170 comprising image data and an indication of color properties for the print job. The processor 140 is then caused to configure the color mapping data 155 from the first storage medium 150 based on the indication of the color properties to obtain a print mapping to use for the print job. The print mapping is generated as a convex combination of color mapping data 155 associated with use of the set of inks 110. The color mapping data 155 is characterized in terms of color properties. An example of this operation is explained in more detail below. Lastly, in the example of FIG. 1, the processor 140 is caused, via execution of the computer program code 165, to generate print instructions 180 for the image rendering device 120. The instructions 180 are generated by mapping the image data in the received print job data 170 to the output color space using the generated print mapping.

The first storage medium 150 and the second storage medium 160 may be the same storage medium. A storage medium may be a non-transitory computer-readable storage medium for example, a hard drive, a CD-ROM disc, a USB-drive, a solid-state drive or any other form of magnetic storage device, optical storage device, or flash memory device, maintained locally or accessed remotely, capable of having thereon computer readable code suitable for the function described herein. In the example of FIG. 1, the first 150 and the second 160 storage medium are located in the same device 130. In other examples, the first 150 and second 160 storage medium may be located remotely from one another or being at least one of them a cloud-based storage.

The print job data 170 may be generated when a user sends an image to be printed. The computing device may be connected to the print processing system 100 through a physical wired connection, a wireless connection, or any other type or combination of physical or non-physical data links. The print job data 170 may be transferred to the print processing system 100 to render the image associated with the print job data 170 onto a print medium. The print job may also comprise data that indicates how the image is to be printed, e.g. an identification of the image rendering device 120, a print medium type for printing, a number of copies to be printed, a size of printed output, whether to print on both sides of the medium, etc. The image data may comprise color information for rendering an image by the image rendering device 120. The image data may comprise any information to render the image specified by the image data using an image rendering device 120. Image data may be in the form of pixels that have associated color data. The image data may be generated by a design or front-end application that is executed by a computing device.

The print job data may comprise an indication of color properties for the print job. In an example, the color properties of a print job are an indication of the desired properties of the output from the image rendering device 120 once the image is rendered on the print medium. Color properties may comprise ink-efficiency. The print medium on which an image has been rendered may be referred to as a rendered output. The indication of color properties for the print job may be generated at the same time as the image data or at another time. The color properties may be manually selected at the user interface of the print processing system 100 or at the computing device. Some examples of color properties may include: lightfastness, gamut volume, ink-efficiency, and grain. Other color properties may also be used. The color properties of a rendered output may be dependent upon the materials and processes used to render the rendered output. Some examples of possible indications of color properties may be, a number relating to the Blue Wool Scale between 1 and 8 (1 being very poor and 8 being very good lightfastness) for lightfastness, a number of colors available to image rendering device for gamut volume, or the standard deviation of density of a number of small areas that are 42 um square for graininess as defined by ISO-13660.

The print processing system 100 may comprise a user interface. The print job data 170 may be generated or input at the user interface of the print processing system 100. The user interface may be implemented as any combination of hardware and programming which allows a user to input and/or select data which is part of the print job data 170. For example, the user interface may comprise a screen for displaying information to the user to enable the user to interact with the print processing system 100. The user interface may have hardware which allows the user to input information for example, buttons, a touch screen, a USB port, or any other interface for inputting data to the system 100. In other examples, the print job data 170 may be generated remotely from the print processing system 100. For example, the print job data 170 may be generated in a separate computing device stored locally or remotely. The computing device may comprise hardware and programming code to implement the function described herein.

The use of different inks in print processing systems may be associated with different color properties for example, some inks may exhibit fluorescence. Fluorescence is the emission of light by a material or substance which has absorbed light or other electromagnetic radiation. Fluorescence is often the emission of light at a longer wavelength than the wavelength of the light which was absorbed. In some examples, the fluorescent inks absorb light which is within the visible wavelength range and emit light which is at a lower wavelength, and hence lower energy, but also within the visible wavelength range. This may allow rendered outputs, rendered using fluorescent inks, to appear bright and colorful in direct sunlight.

Lightfastness is a property which defines how resistant to fading a colorant, such as an ink or dye, may be. When exposed to electromagnetic radiation, many colorants will fade or bleach over time. This is caused by the interaction of the electromagnetic radiation with the chemical structure of the colorants. The fading, or bleaching, of a colorant over time will be accelerated if the colorant is exposed to more intense electromagnetic radiation. Different inks may have different lightfastness properties. Some inks have archival quality lightfastness and when deposited on a substrate may take years to fade even in direct sunlight. Other inks, for example, fluorescent inks, are much less lightfast. Images rendered by fluorescent inks (or comprising them), when exposed to direct sunlight may fade or bleach within weeks. In some extreme cases, changes in color may be noticeable within hours or days. It may be desirable to produce rendered color outputs which are lightfast such that they may be used for many years and do not need to be reproduced. In the example print processing system 100 of FIG. 1, the set of inks 110 may comprise some base inks having no fluorescence and some fluorescent inks such as 110a and 110b respectively.

In this context, gamut may be a complete subset of colors which can be represented within a given color space. Gamut volume may be a measure of the size of the gamut available when producing, or used to produce, a rendered color output. A rendered output produced with a small gamut volume will have few colors. Whereas, a rendered output produced with a large gamut volume will have many colors. In some examples, a gamut volume may be defined by the number of colors available within a gamut, e.g. a number of discrete points within an output color space. A color gamut of a printing system 100 may be defined by the inks available to said printing system which define the color space and the gamut volume may be increased by using a broader range of inks. For example, a printing system 100 which uses a given printing process to generate colors for rendered outputs will have a first color gamut when using an ink set comprising: cyan, magenta, yellow, and black (CMYK). This printing system will have a second gamut when using an ink set comprising: cyan yellow, magenta, black, red, green, blue (CMYKRGB) and if the process of printing is the same in both cases then the gamut volume of the first gamut will be smaller than the gamut volume of the second gamut as fewer colors will be available to the printing system 100. The gamut volume of a printing system 100 may also be increased by employing different techniques when printing using a given ink set. In many printing systems it may be desirable to have as large a gamut volume as possible. Having a large gamut volume allows rendered outputs to appear vibrant and colorful and may allow for more fine detail to be displayed in the rendered output. If a printing system has a limited gamut volume, then the colors may look flat or washed out or parts of the image which have a small difference in their color may appear to be the same color and will result in a loss of detail.

Ink-efficiency is a measure of how much ink is used in a print processing system 100 to generate a rendered color output. It may be possible to increase the ink-efficiency by using less ink when producing a rendered color output. However, reducing the amount of ink used may increase the graininess, reduce the gamut volume, or have other effects on the color properties of the rendered color output. The ink-efficiency may be dependent on the printing process used to render the image. For example, halftoning may be more ink efficient than pre-mixing inks in desired ratios before applying them to a print medium.

The color properties of rendered color outputs may be related and may dependent on each other. The color properties of rendered color outputs may be dependent on the type of inks used to produce them, the ratios of each ink used, the total amount of ink used, the process used to render the image onto the print medium, the print medium onto with the image is rendered, and/or other variables involved in the print process.

The gamut volume of a print processing system 100 may be dependent on the combination of inks that are used to render an image. In an example, combinations selected from a base ink set having no fluorescent inks and at least one fluorescent ink 110*b* may increase the gamut volume when compared with a base ink set with no fluorescent inks. For example, adding a fluorescent yellow ink to a base CMYK ink set may allow the gamut to be expanded in an area of the color space associated with yellow colors. However, as discussed above, fluorescent inks may be less lightfast than the base inks of a CMYK ink set. Accordingly, colors in the gamut which are produced using a higher proportion of the fluorescent yellow may fade at a faster rate than the colors in the gamut which are produced using a lower proportion or no fluorescent ink. In other examples, base ink sets may be CMYKRGB, CMYRGB or any other ink set. A base ink set may comprise any number of inks. In some examples, the ink set used by a print processing system may dependent on the type of image rendering device. For example, an inkjet printer for printing on paper may use a CMYK ink set whereas a textile or latex printer may use an ink set comprising CMYKRGB. In some example multiple fluorescent inks may be added to the ink set for example, there may be six base inks and two fluorescent inks. When producing rendered outputs in print processing systems, it may be desirable to produce a rendered output using as broad a gamut as possible while also maintaining a high lightfastness. Accordingly, when it is desired to increase the lightfastness of a rendered color output it may be possible to do so by using a higher proportion of inks which do not exhibit fluorescence. However, in doing so it should be noted that the available gamut for rendering an image onto a print medium may be reduced and hence the appearance of the rendered output may vary.

In another example, there may be trade-off between the gamut volume (i.e. an available gamut) and ink-efficiency. By reducing the volume of ink used in a print processing system 100 to produce rendered outputs using a set of base inks, the print processing system may have a higher ink-efficiency. However, by using less ink when rendering an image onto a print medium, the gamut volume may be smaller. One way of managing this reduction in gamut volume may be to increase a proportion of fluorescent inks used in the print processing system 100. As fluorescent inks enable a larger gamut volume as compared to non-fluorescent inks, it may be possible to increase the gamut volume while maintaining a particular level of ink efficiency by using a higher proportion of fluorescent inks. However, as discussed above, this may make the rendered output less lightfast and hence more prone to fading.

In another example, there may be a trade-off between ink-efficiency and grain. When using inks to generate rendered outputs in print processing systems, black can be produced using a combination of the available color inks, this is called a composite black, or by using black ink. For example, in a print processing system having a CMYK ink set, black may be produced by combining the colors cyan, magenta and yellow. This creates a composite black and its appearance can be modified by increasing the proportion of the inks. Black may also be directly applied by using the black ink. Selecting a system to print with a low grain may increase the amount of composite black ink used in rendering the image. Whereas, by selecting a higher grain alternative, the amount of composite black used may decrease and the amount of black ink used may increase. This trade-off may also include lightfastness considerations. If the composite black is produced by combining fluorescent color inks, then the resultant black may be less lightfast than a comparative ink set with no fluorescence. Moreover, if one fluorescent ink is used in combination with non-fluorescent inks to produce the composite black, then as the fluorescent ink fades due to exposure to light, the black may not fade evenly but may discolor due to fading of the fluorescent ink color in the composite black.

Consideration may also be given to the choice of print medium when considering the color properties of rendered color outputs. Different print mediums may exhibit different levels of lightfastness when the same image is rendered onto them using the same set of inks. This may be due to chemicals or processes applied to the print medium before or after the image is rendered. Gamut volume may also be affected by the print medium used. For example, where a print medium has been treated with optical brighteners, the color properties may be different to cases where the print medium is not treated with optical brighteners.

Different users may produce rendered outputs for different uses, and a single user may use a single print processing system to produce rendered color outputs for use in different situations. For example, a print processing system 100 may be used to produce a poster or advertisement for a shop which is to be displayed for a number of years. In this case, it may be desirable that the rendered output is as lightfast as possible such that it does not need to be replaced during the time it is on display. The same print processing system 100 may also be used to produce brochures that are to be distributed for a short period of time and/or will be replaced with updated brochures regularly. In this case too, it may be desired that while the brochures are in use the colors do not fade or discolor. However, the period of time for which the brochures are used may be considerably shorter than the period of time for which the poster will be used. Certain examples described herein provide a way to alter ink-use based on these specifications. Lightfastness constraints may also be applied together with other constraints. For example, many thousands of copies of a brochure may be printed for distribution. In this case, ink-efficiency may be traded-off against lightfastness and gamut volume. These constraints may not apply for the production of the poster.

In an example, the color mapping data 155 from the first storage medium 150 may be configured based on the indication of the color properties to obtain a print mapping to use for the print job. As discussed above, the output color space may be colorant-dependent. With the indication of the color properties of the rendered output received in the print job data 170, a selection of the print mapping is made for the print job which may result in a set and/or specified ratios of colorants being selected. In an example, the set of inks 110 in the print processing system 100 may comprise non-fluorescent inks and fluorescent inks, e.g. as respective ones of inks 110a and 110b. The selection of color mapping data may include a selection of a color mapping which is related to a proportion of non-fluorescent and fluorescent inks 110a-110b to use. The selection of this color mapping data may determine the selection of inks to use in the print process. In an example, the color properties are lightfastness and gamut volume. In this case, a technique for printing may be a way of mixing similarly colored fluorescent 110b and non-fluorescent 110a ink. By doing so it may be possible to maximize the gamut while maintaining a desired lightfastness. Other techniques are possible and may be determined by the desired color properties indicated in the print job data 170.

In order to generate the print mapping, the color mapping data may be characterized in terms of color properties. Color mapping data may be in the form of look-up tables which relate to certain combinations of inks, printing methods, or substrates. Rendered outputs may be produced using at least some of these look-up tables and the color properties may be measured. This then allows the color properties of intermediate combinations of these variables to be calculated. This allows the selection of a set of color mapping data based on its associated color properties without directly measuring the color properties of that particular set of color mapping data. This allows the print processing system 100 to produce rendered color outputs according to the indicated color properties without all the combinations of inks, printing processes, substrates, etc. having to be measured directly. In an example where the desired color properties are lightfastness and gamut, and the variable in the printing process may be the combination of fluorescent and non-fluorescent inks, an example measurement procedure may be carried out as described below.

A first rendered output may be produced in a print processing system 100 using a base ink set. The rendered output may include test patches, Different patches in the test being generated with different percentage coverage areas using different inks available in the base ink set. The colors of the test patches in the rendered output are then measured in color terms (in either spectral or tristimulus terms) using a spectrophotometer, a tristimulus colorimeter, or any other suitable device. These measurements are used to generate look-up tables which define the color mapping associated with the use of the base ink set. This may be performed for a second rendered output produced using a different set of inks which may be a combination of fluorescent and non-fluorescent inks for example. This process may be a pre-processing step, with the two resultant look-up tables being supplied to the print processing system 100. A combination may comprise use of a base set of non-fluorescent inks with a predefined proportion of one or more fluorescent inks. For example, combinations may comprise use of a CMYK base ink set and a proportion, P, of a fluorescent Magenta ink, where P varies between the combinations (e.g. is a value from 0% to 100%, representing no use to full use).

Once the look-up tables are generated then the rendered outputs may be measured in terms of their color properties for example, lightfastness. The result of this measurement may then be associated with the look-up table used to produce the respective rendered output. Gamut volume may be calculated based on the nodes of the look-up table where the nodes of look-up table represent printable output colors. Intermediate look-up tales may be generated by the weighted sum or another linear combination of nodes in at least two other look-up tables such as the two look-up tables discussed above. As the intermediate look-up tables may be generated as the convex combination of the nodes in other look-up tables the color properties of the intermediate look-up tables may be related through the color mapping data.

Figure 2:
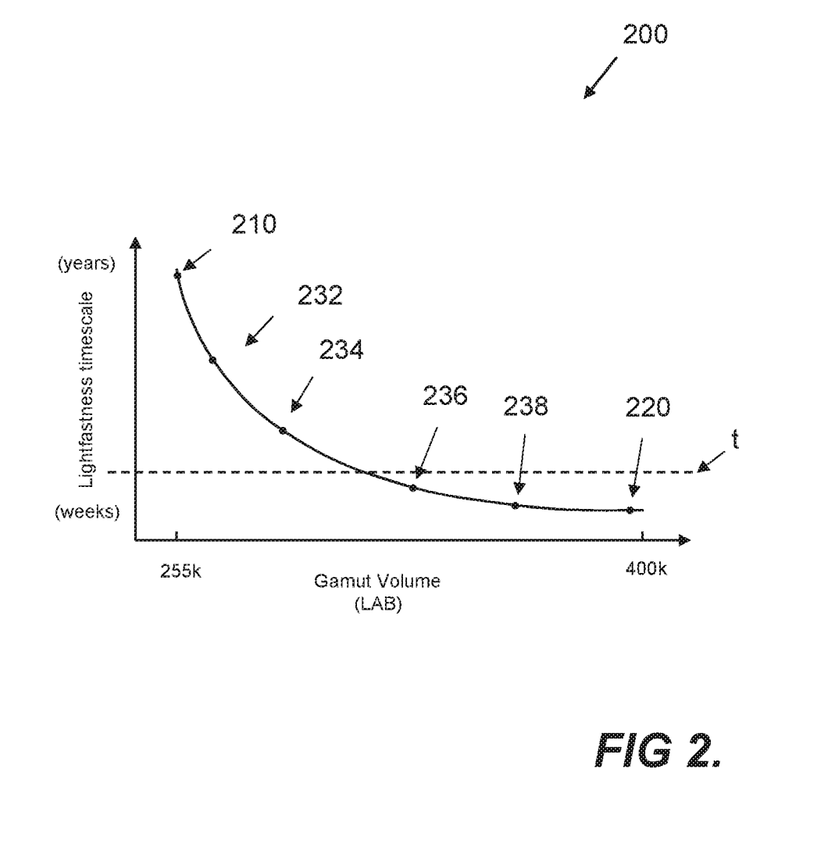
FIG. 2 is a chart illustrating a trade-off between gamut volume and lightfastness.

FIG. 2 shows an example chart 200 that illustrates a measured relationship between gamut volume (x-axis) and lightfastness (y-axis) based on different combinations of inks. Color properties of a first rendered output 210 and a second rendered output 220 have been characterized, e.g. via measurement and/or calculation, and plotted. In some examples, gamut volume may be a value representing the number of available colors for a particular color mapping. For example, the color mapping used to generate the first rendered output 210 may have 255,000 available colors which can be represented by coordinates in the CIELAB space, whereas the color mapping used to generate the second rendered output 220 may have 400,000 available colors in the CIELAB space. In other examples gamut volume may be measured Gamut volume may also be calculated by representing the colors in a CIELAB color space and calculating based on the L*, a*, and b* values for each available ink, may be measured by using a spectral sensor such as spectrophotometer or a spectroradiometer and then characterizing the spectral response based on known color responses. In other examples, the gamut volume may be computed from color mapping data used to generate the rendered output, e.g. based on node values of a look-up table for the particular combination of inks. In the example of FIG. 2, lightfastness may be characterized by measurement following accelerated aging of the rendered output. Accelerated aging may include exposing the rendered output to high intensity electromagnetic radiation and measuring the time it takes for the rendered output to exhibit fading or discoloration, e.g. as measured by way of light intensity for one or more wavelengths of visible light, Measurements of lightfastness may be processing to determine a value of lightfastness under standard (e.g. non-accelerated) illumination conditions. The measurements may be used to predict how long it may take for a rendered output to exhibit fading or discoloration when exposed to natural light or when exposed to the type of light it will be exposed to during its use.

In certain cases, the measurements shown in FIG. 2 may be performed for a particular range of wavelengths, e.g. representing a particular color. These measurements may be repeated for different wavelength ranges. For example, the chart of FIG. 2 may be determined with reference to a Yellow or Magenta fluorescent ink, and measurements of lightfastness taken in corresponding Yellow or Magenta wavelength bands, or characterization may be determined based on measurements in both wavelength bands, e.g. as averaged or summed. In certain cases, desired color properties may be driven by "worst case" situations for example, a lightfastness measurement may be based on the shortest fading time across all colors.

In some examples, a colored fluorescent ink may be introduced that has a corresponding non-fluorescent ink. For example, a Yellow or Magenta fluorescent ink may be used, corresponding to Yellow or Magenta inks in a CMYK base set. As the fluorescent ink's proportion of the total amount of ink is increased, the proportion of the equivalently-colored non-fluorescent ink may be decreased such that the fluorescent ink replaces the non-fluorescent ink. In other examples, two or more fluorescent inks may be introduced and, in the same way, may replace their respective non-fluorescent inks as their proportion is increased.

In some examples, the selection of color mapping data may result in colors being produced using a proportion of fluorescent ink and a proportion of equivalently colored non-fluorescent ink. Certain color mappings which use a non-fluorescent and a fluorescent ink which are similarly colored may fade more gracefully than colors which are produced from just fluorescent inks. As the fluorescent ink begins to fade more rapidly than the non-fluorescent ink, the color on the rendered output will be composed of a higher proportion of the non-fluorescent ink. If the proportion of fluorescent ink is below a certain threshold then the color may appear to fade gracefully. When a color fades gracefully, it may fade but as there remains a high proportion of non-fluorescent ink in the color it does not fade as quickly and does not discolor to the same degree. An indication of so called "graceful fading" may exist in the characterization of the color properties of the color mapping data. For example, in FIG. 2 there is an indication at the line "t" of the limit of graceful fading. Above this line the colors of the rendered output may fade gracefully due to the ratio of fluorescent to non-fluorescent ink used to produce the rendered color output. Whereas below the line, the ratio of fluorescent ink to non-fluorescent may be too high and the fading of the colors of the rendered output may be obvious.

The printing system 100 may generate intermediate color mapping data relating to intermediate combinations of inks and characterize these combinations. For example, characterization may comprise measuring lightfastness for a computed gamut volume, e.g. as described above. Each set of intermediate color mapping data may relate to a different combination of inks, e.g. a combination including a base set of inks and a defined proportion, P, of at least one fluorescent ink. In some examples, the characterization of color properties relating to color mapping data is performed after the intermediate color mapping data is generated. Once the intermediate color mapping data is generated, test outputs may be rendered using at least some color mapping data. The color properties of these test outputs may be measured and associated with the appropriate color mapping data. In some cases, it may be desired to obtain more accurate information about the relation between the color properties and the color mapping data. This may be done by producing more test outputs using more of the intermediate color mapping data. FIG. 2 also shows an example of the plots of some of these intermediate combinations in an example where the color mapping data is related to the use of certain inks.

The chart of FIG. 2 plots lightfastness against gamut volume for a plurality of ink combinations including the first 210 and second 220 ink combinations and a set of intermediate ink combinations 232-238. With these ink combinations plotted it is possible to determine a relationship between lightfastness and gamut volume for a range of ink combinations. This has been drawn as a solid curved line on the chart. The relationship may be defined using, for example, polynomial or linear regression. The relationship shown in the chart of FIG. 2 may be used to characterize the gamut volume and lightfastness of other intermediate ink combinations which have not been rendered and had their color properties measured. For example, gamut volume may be computed for particular ink combination, and then a lightfastness value may be estimated based on the computed gamut volume.

Using color mapping data 155 relating to at least two combinations of inks, where each combination is characterized by values for lightfastness and gamut volume, a print mapping may be generated. For example, the print job data 170 may comprise an indication of either a desired gamut volume value or a desired lightfastness. Using the defined relationship, e.g. as shown in FIG. 2, a set of gamut volume and lightfastness values may be computed, e.g. by locating the appropriate point on the curve. Given this set of values, a determination of the appropriate combination of inks may be determined. For example, if the data point 210 relates to 0% fluorescent ink use and the data point 220 relates to 100% fluorescent ink use, then the proportion, P, may be determined for the set of gamut volume and lightfastness values as indicated in the print job data 170. Given this proportion, the print mapping may be determined based on a convex combination of color mapping data associated with different proportions of ink use. In one case, the print mapping may be computed dynamically by interpolating between color mapping data for different ink combination. In other cases, pre-computed color mapping data, e.g. that represents a convex combination of data for different ink usage, that has a proportion closest to P may be used. For example, this may correspond to picking one of the labelled points on the curve of FIG. 2 that is closest to a point on the curve associated with the desired color properties. Each point may then be associated with a different color look-up table that has been characterized as described above. In an example, the convex combination of color mapping data 155 associated with the use of the set of inks 110 is a convex combination of color mapping data associated with the use of non-fluorescent inks and color mapping data associated with the use of fluorescent inks. The print mapping may be a mapping to an output color space, where the output color space is dependent on the colorants available in the image rendering device.

It is noted that although the description above has focused on the use of ink ratios to alter the color properties of lightfastness and gamut in rendered outputs and to generate a print mapping, the same methods may be applied to other color properties such as to manage ink efficiency, and may be applied to other techniques of altering said properties for example the print mapping may be dependent on the type of substrate onto which the image rendering device 120 is configured to render the image using the set of inks 110.

As shown in FIG. 1, a configured print mapping is used to generate print instructions 180 for the image rendering device 120. In some examples, these instructions may include which inks to use to render the image, volumes of each ink to use, methods of printing, or any other information which may be used by the image rendering device 120 to render the image onto a substrate.

Figure 3:
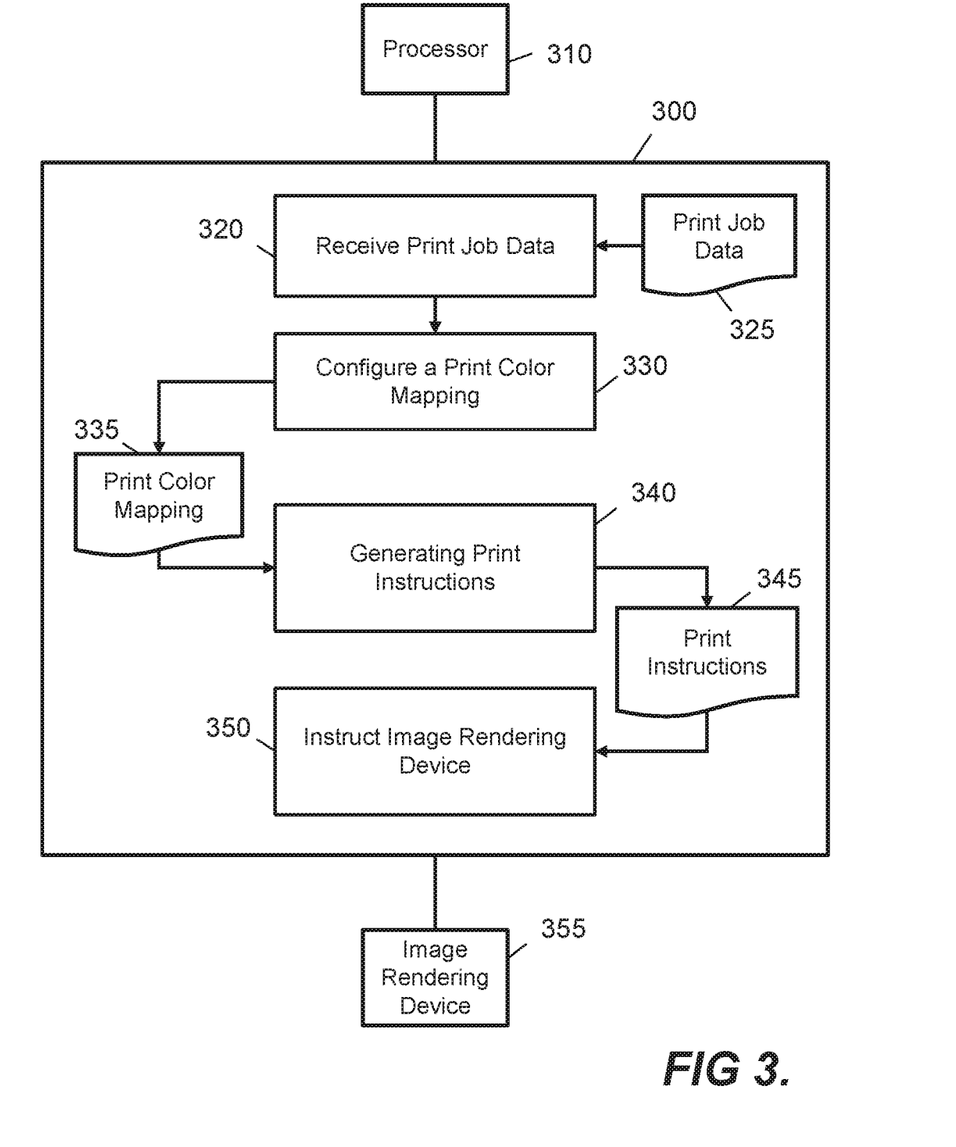
FIG. 3 is a schematic diagram of a non-transitory computer-readable storage medium according to an example.

FIG. 3 shows a schematic diagram of an example non-transitory computer-readable storage medium 300 storing instructions that, when executed by a processor 310, cause the processor 310 to perform the operations described below. A first set of instructions 320 may cause the processor 310 to receive print job data 325 comprising image data for an image to be printed and print property data indicating desired color properties for the image. The print property data may be generated at a user interface. In some examples the desired color properties are directly selected by a user. This may be done by the use of a slider implemented on a screen of a user interface which can be moved to select a trade-off between two color properties. For example, where the color properties are lightfastness and gamut volume, one side of the slider may be used to select archival-quality lightfastness but a smaller gamut volume, whereas the other side of the slider may represent an option where the print job is rendered using the largest gamut volume possible, but with an associated low lightfastness value, e.g. indicating the rendered output may begin to fade in a matter of weeks. It may be possible to implement a multidimensional slider which allows the user to select a trade-off between more than two color properties. In other examples where the user directly selects the color properties, the user may be able to enter values for the color properties such as a gamut volume or a minimum lifespan (time without fading). In other examples, the user may interact with a front-end program at the user interface, and upon selection of the type of print job for example, poster, leaflet, photograph, document, the print processing system may select the desired color properties according to stored information related to this type of print job.

A second set of instructions 330 may cause the processor 310 to configure a print color mapping 325 for the image data based on the print property data. Configuring the print color mapping for the image data based on the print property data may comprise comparing print property data to color properties associated with color mapping data. Once a comparison of color properties and print property data is made, the most suitable color mapping data (i.e. a suitable or best match) may be selected based on its color mapping properties. In this case, the print color mapping 325 is generated as a convex combination of color mapping data associated with use of the set of inks, the color mapping data being characterized in terms of color properties. Some sets of the color mapping data may be generated by the convex combination of at least two other sets of color mapping data. For example, a first look-up table may be defined by a configuration based on the use of a set of inks and a second look-up tale may be defined by a different configuration based on the use of a different set of inks. Intermediate look-up tables may be generated by the convex combination of these look-up tables. By taking the weighted sum of nodes in the two look-up tables it is possible to generate a set of intermediate look-up tables where the convex weights at each node may be different. The look-up tables may be characterized in terms of their color properties such as lightfastness. In some examples, the convex weights used in the weighted sum may be based on a relation such as that shown in FIG. 2. The configuration of the print mapping may take the colors used in the image data into account. For example, some combinations of fluorescent inks and non-fluorescent inks may have different lightfastness properties in different regions of the color space. If, for example, a blue fluorescent ink is solely included in the ink set then the parts of the color space which are composed of less blue ink will have a longer lightfastness value than areas of the color space which are produced using a higher proportion of the blue ink. As such, if an image has a small amount of color in the area of the color space which has a low lightfastness value then that print color mapping may be selected.

A third set of instructions 340 cause the processor 310 to generate print instructions 345 by mapping the image data from an input color space to an output color space of an image rendering device 355 using the print color mapping 335. In one example, the input color space may be a sRGB color space and the mapping may be to an NPac color space. In this case the nodes of the look-up table will relate to a mapping from sRGB to NPac vectors. There may also be a step of halftoning included in the color mapping data to specify the spatial distribution of the area coverages which are defined in the NPac space such that the outputs are generated using a HANS printing pipeline. The output color space of an image rendering device 355 is dependent upon the resources used to produce the rendered output e.g. the available inks. The print color mapping 335 is dependent on the desired color properties indicated in the print job data 325. In some examples, the desired color properties in the print job data 325 comprise an indication of lightfastness and/or gamut volume. This indication may be used to determine the color mapping data that is used to generate the print color mapping 335. For example, this indication may be used to select the proportion of each node in a convex combination of look-up table nodes, where the nodes are taken from two look-up tables representing different ink combinations (e.g. one representing a base ink set and one representing a base ink set plus one or more fluorescent inks). In other examples, the desired color properties may comprise a desired ink-efficiency for the rendered output, an indication of gamut volume and ink-efficiency, an indication of grain level and desired ink-efficiency, or any other combination of color properties. The desired color properties may include an indication of three or more color properties.

A fourth set of instructions 350 causes the processor 310 to instruct the image rendering device 355 to render the image on a substrate using the set of inks according to the print instructions 345. Instructing the image rendering device 355 may include sending data to the image rendering device 355 over a wired or wireless connection.

Figure 4:
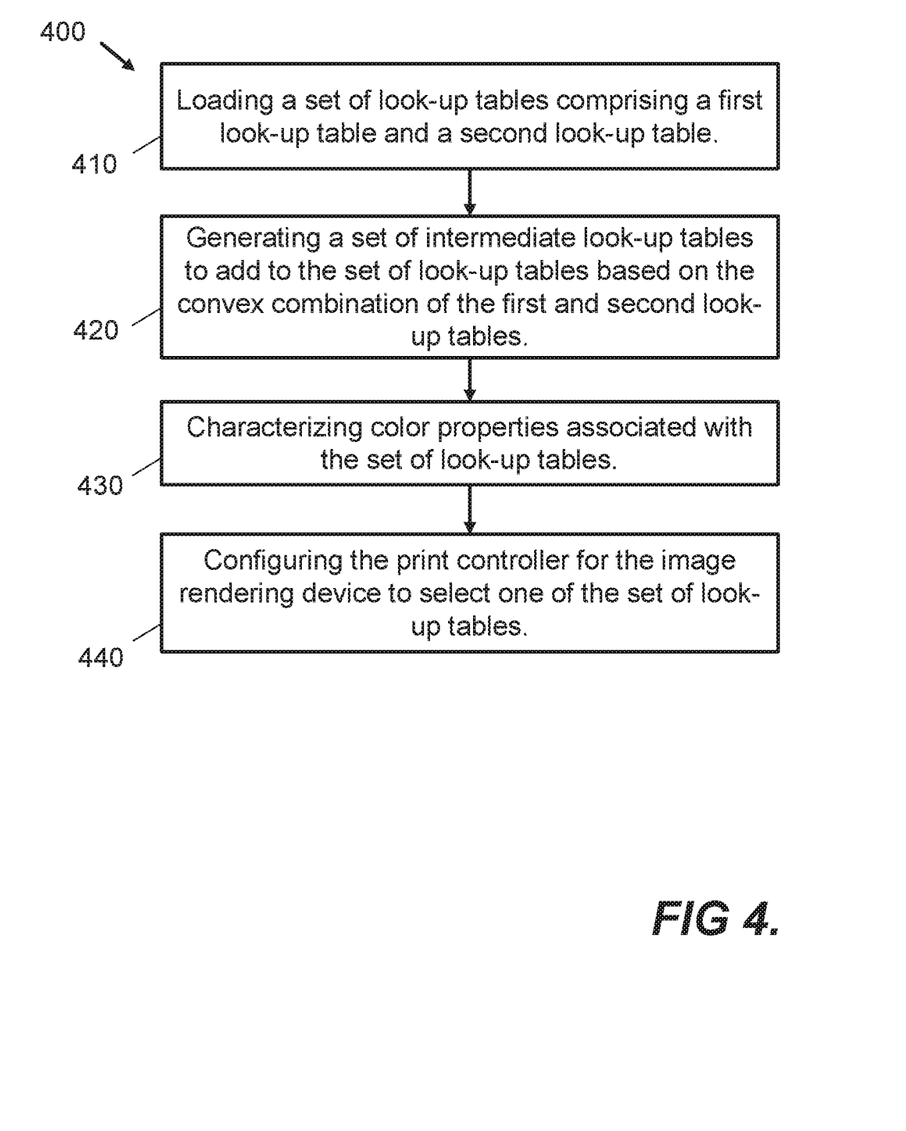
FIG. 4 is a flow chart showing a method of configuring a print controller for an image rendering device.

FIG. 4 illustrates a flow diagram of an example method 400 of configuring a print controller for an image rendering device. At block 410 the method comprises loading a set of look-up tables. The set of look-up tables comprises a first look-up table for a first configuration of the image rendering device and a second look-up table for a second configuration of the image rendering device. The first and second configurations of the color rendering device may relate to different combinations or ratio of inks. The ratio of inks may be a ratio of fluorescent to non-fluorescent inks. For example, the first look-up table may comprise a color mapping for a base ink set containing no fluorescent inks and the second look-up table may comprise a color mapping for use of the base ink set with one or more fluorescent inks. As described previously, use of a fluorescent ink may be offset by a reduction in the use of a corresponding non-fluorescent ink. For example, the second look-up table may relate to use of a base ink set with 50% non-fluorescent Magenta and 50% fluorescent Magenta.

The first and second look-up tables map from an input color space to an output color space, the output color space being associated with the image rendering device. For example, the first and second look-up tables may comprise a mapping from RGB or CIEXYZ space to an area coverage space, such as a color space based on Neugebauer Primary Area Coverages. In certain cases, the look-up tables may also depend on other properties of the first and second configurations, such as substrate type, post-processing and the like. The first and second configurations may be different configurations of the image rendering device wherein at least one element of the configuration varies.

At block 420 in FIG. 4, the method comprises generating a set of intermediate look-up tables to add to the set of look-up tables. The intermediate look-up tables are generated based on a convex combination of nodes from the first and second look-up tables. The weights used in the convex combination of nodes from the first and second look-up table may be different for each intermediate look-up table such that each intermediate look-up table differs from other intermediate look-up tables by the value of at least one node. The weights may be based on different proportions of fluorescent ink use, e.g. 0 to 50% or 100% fluorescent Yellow or Magenta (with or without corresponding reductions in the base Yellow or Magenta).

In some examples the method may involve generating a set of intermediate look-up tables which span a particular subset of possible combinations between the first and the second look-up tables. The subset may be selected based on an indication of the desired color properties from a user input. The generation of the intermediate look-up tables may be performed prior to printing. For example, the intermediate look-up tables may be generated as part of a printer calibration procedure that is run when the printer is installed and/or periodically, e.g. based on changes in the image rendering device configuration.

At block 430, the method comprises characterizing color properties associated with the set of look-up tables. This may comprise rendering a set of test images, wherein each test image is produced using one of the set of look-up tables. The color properties of the rendered test images may then be measured. This may involve measuring values for lightfastness. Characterizing color properties may also involve computing color properties from the nodes of the look-up table. For example, a gamut volume may be computed by processing the set of output nodes of the look-up table. The characterization may comprise associating color property values with each of the look-up tables in the set, e.g. lightfastness and/or gamut volume values may be stored together with an identifier for a look-up table. Block 430 may also comprise determining how the color properties vary with the configurations associated with each of the set of look-up tables. For example, if the intermediate look-up tables relate to different proportions of at least one fluorescent ink, then a relationship between this proportion and lightfastness or gamut volume may be computed. This may then allow a particular convex combination of nodes to be generated given a supplied indication of lightfastness or gamut volume.

As described above, the relationship between the variables which define the look-up tables and the color properties which are being characterized may be based on data collected from sample rendered outputs. In an example, the first configuration relates to the use of a first set of inks and the second configuration relates to the use of a second set of inks. Generating a set of look-up tables may comprise generating a set of intermediate look-up tables representing different combinations of the first and second set of inks. In an example, these intermediate look-up tables are generated by the convex combination of the nodes in the look-up tables associated with the first and second configurations. Characterizing color properties associated with at least one of the look-up table may comprise, for a given look-up table in the set of look-up tables, configuring the print controller to use the given look-up table to map image data to print data. Once the print data is obtained then the characterizing may involve rendering an image based on the print data. Color property values of the rendered image may be measured and associated with the given look-up table. In an example, the above process of characterizing the color properties of a rendered output is performed for at least two look up tables.

At block 440, the method comprises configuring the print controller for the image rendering device to select one of the set of look-up tables to map image data to print data, the selection being based on an indication of a desired color property associated with a print job. In an example, the indication of a desired color property may be an indication of a desired lightfastness value e.g. an 8 on the Blue Wool Scale. In this example, selecting a look-up table comprises filtering the set of look-up tables, each of which may have a Blue Wool Scale value associated with it and selecting the look-up table with associated with a Blue Wool Scale value of 8. In some examples, such as where a print processing system has two or more fluorescent inks, two look-up tables may be associated with the same Blue Wool Scale value. In this case, selecting the look-up table may include comparing a different color property of the two look-up tables to determine which of the two to select for example, a comparison of gamut volume. The indication of color properties may include an indication of at least two color properties.

Although the blocks of the method 400 of FIG. 4 are shown sequentially, it is understood that they may be performed in a different order than that described above. For example, it may be possible to characterize the color properties of at least one of the look-up tables by direct measurement before generating the set of intermediate look-up tables. Some parts of the method may be performed at the print processing system, whereas other parts of the process such as the characterization of the color properties may be performed elsewhere. For example, the characterization of the color properties of at least one look-up table may be performed by taking direct measurements of sample outputs using techniques such as accelerated again or spectroscopic analysis. This may be performed at a manufacturing site under factory conditions, and the resulting data distributing to installed printing systems. Other color properties such as ink-efficiency may be computed rather than measured.

In some examples, a print processing system may comprise post processing capabilities. Post processing may include, amongst other techniques, laminating, application of optical brighteners or, in the case of printing on textile mediums; calendering. In some cases; the post processing of a rendered output alters the color properties. In these cases, the characterization of the color properties of the look-up tables may take into account the final appearance of the rendered output once post processing has been applied. The color properties, associated with the at least one look-up table for which a rendered output is produced and color properties characterized, may be measured after the rendered image has undergone post-processing.

Figure 5:
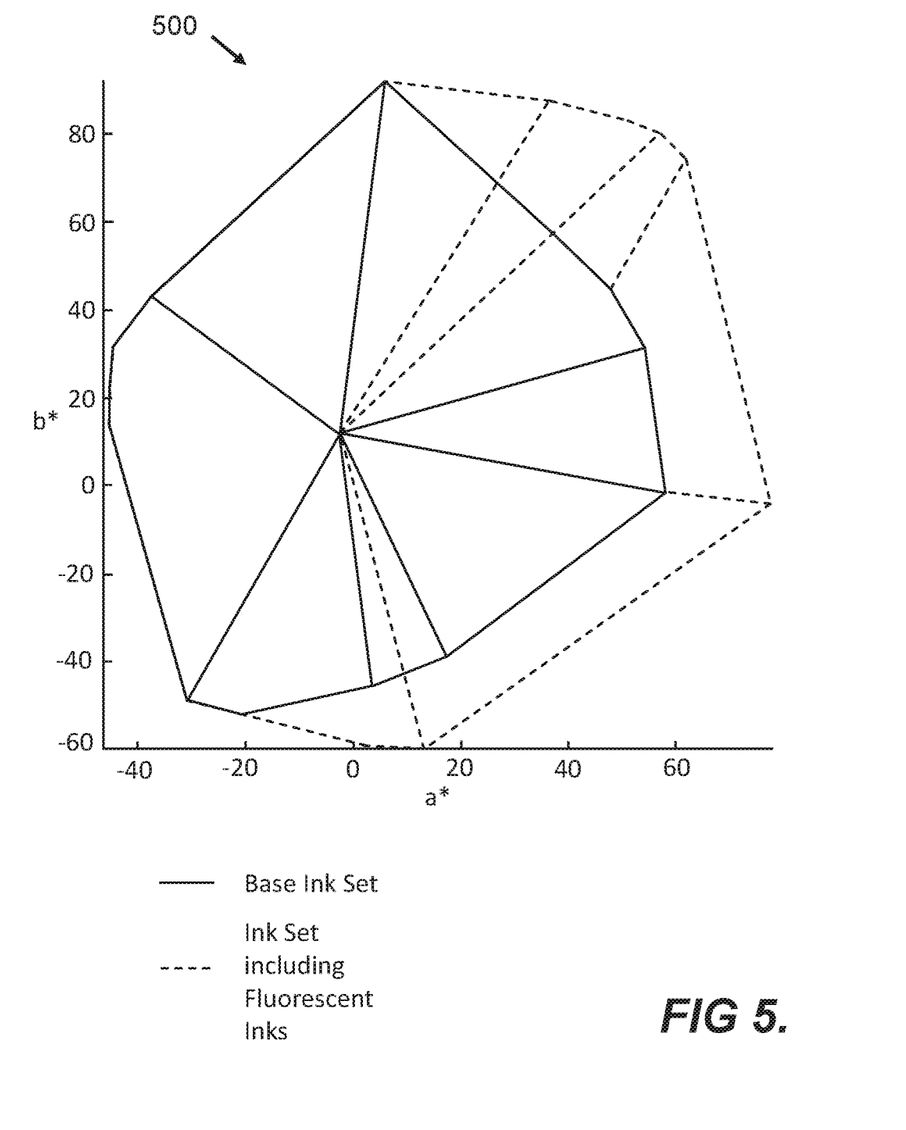
FIG. 5 is a chart illustrating a gamut of a base ink set and a gamut of an ink set having at least on fluorescent ink.

FIG. 5 shows a chart 500 which illustrates a gamut of a base ink set, shown in solid lines, and a gamut of an ink set with at least one fluorescent ink, shown in broken lines. The two gamuts are plotted in a CIELAB color space where: a* represents the red/green components of the color; with green represented at negative a* values and red represented by positive a* values; and b* represents the yellow/blue components of the color, with blue represented at negative b* values and yellow represented at positive b*values. The L axis, not visible in this representation, goes into the page and is a measure of the brightness of the color. The value of L=0 represents the darkest black and L=100 represents the brightest white.

In FIG. 5, the volume enclosed by the lines for each plot is representative of the gamut volume. As such, the larger the volume which is enclosed by the lines in the plot the more colors are producible by that combination of inks. As can be seen in FIG. 5, the overall gamut volume for the set of inks comprising a fluorescent ink is larger than the gamut volume for the set of inks comprising the base set of inks and no fluorescent ink.

Certain examples described herein allow for a user of a print processing system to select desired properties the rendered outputs. A user can select a desired property for a rendered output to be printed using provided image data. The desired property may be an indication of lightfastness, gamut, ink efficiency, or graininess. The print processing system may choose a color mapping from the image data to the image rendering device which satisfies the color properties indicated and which optimizes other color properties associated with the rendered output. The indication of the color properties may be generated by a user or selected automatically in a print process by the print processing system and may be based on the use for the rendered output. A user can manage the trade-off between color properties which affect each other. This may allow print processing system which have different types of inks or different substrates to be used for producing rendered outputs for use in different environments.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A print processing system comprising:
   an image rendering device to render an image onto a print medium using a set of inks; and
   a controller to control the image rendering device comprising:
      a processor;
      a first storage medium storing color mapping data to map between an input color space associated with an image to be rendered and an output color space associated with the image rendering device; and
      a second storage medium storing computer program code that, when executed by the processor, causes the processor to:
         receive print job data comprising image data and an indication of color properties for the print job;
         configure the color mapping data from the first storage medium based on the indication of the color properties to obtain a print mapping to use for the print job, the print mapping being generated as a convex combination of color mapping data associated with use of the set of inks, the color mapping data being characterized in terms of color properties; and
         generate print instructions for the image rendering device, the instructions being generated by mapping the image data in the received print job data to the output color space using the print mapping.

2. The print processing system of claim 1, wherein the set of inks comprises fluorescent inks and non-fluorescent inks.

3. The print processing system of claim 2, wherein the color properties comprise at least one of lightfastness and gamut volume.

4. The print processing system of claim 3, wherein the convex combination of color mapping data associated with the use of the set of inks is a convex combination of color mapping data associated with the use of the non-fluorescent inks and color mapping data associated with the use of the non-fluorescent inks and the fluorescent inks.

5. The print processing system of claim 1, wherein the print mapping is dependent on a type of substrate onto which the image rendering device is configured to render the image using the set of inks.

6. A print processing system according to claim 1, wherein the processor receives an indication of one of lightfastness and gamut volume from a user interface and configures the color mapping data by generating a print mapping in accordance with the received indication and optimizes a value for the other color property.

7. A non-transitory computer-readable storage medium storing instructions that, when executed by a processor, cause the processor to:
   receive print job data comprising image data for an image to be printed and print property data indicating desired color properties for the image;
   configure a print color mapping for the image data based on the print property data, the print color mapping being generated as a convex combination of color mapping data associated with use of the set of inks, the color mapping data being characterized in terms of color properties;
   generate print instructions by mapping the image data from an input color space to an output color space of an image rendering device using the print color mapping; and
   instruct the image rendering device to render the image on a substrate using the set of inks according to the print instructions.

8. The storage medium of claim 7, wherein the desired color properties comprise an indication of at least one of lightfastness and gamut volume.

9. The storage medium of claim 7 wherein the computer program code of the second storage medium causes the processor to, in order to configure a print color mapping for the image data based on the print property data:
   compare print property data to color properties associated with color mapping data; and
   select color mapping data to match the color properties.

10. The storage medium of claim 7, wherein indication of color properties comprises an indication of at least two color properties including ink-efficiency.

11. The storage medium of claim 7, wherein color mapping data is implemented as a set of look-up tables comprising a mapping between input color vectors of an input color space to a set of Neugebauer Primary Area Coverage vectors.

12. A method of configuring a print controller for an image rendering device comprising:
   loading a set of look-up tables comprising a first look-up table for a first configuration of the image rendering device and a second look-up table for a second configuration of the image rendering device, the first and second look-up tables mapping from an input color space to an output color space, the output color space being associated with the image rendering device;

generating a set of intermediate look-up tables to add to the set of look-up tables based on a convex combination of nodes from the first and second look-up tables;
characterizing color properties associated with the set of look-up tables; and
configuring the print controller for the image rendering device to select one of the set of look-up tables to map image data to print data, the selection being based on an indication of a desired color property associated with a print job.

13. The method of claim 12, wherein:
the first configuration relates to use of a first set of inks and the second configuration relates to use of a second set of inks;
generating a set of intermediate look-up tables comprises:
generating a set of intermediate look-up tables representing different combinations of the first and second set of inks;
characterizing color properties associated with at least one of the look-up tables comprises, for a given look-up table in the set of look-up tables:
configuring the print controller to use the given look-up table to map image data to print data,
rendering an image based on the print data,
measuring color property values of the rendered image, and
associating the measured color property values with the given look-up table.

14. The method of claim 13, wherein the color properties of the rendered image for a given look-up table are measured after the rendered image has undergone post-processing.

15. The method of claim 13, wherein the first set of inks comprise non-fluorescent inks and the second set of inks comprise non-fluorescent inks and fluorescent inks and the color property values comprise lightfastness measurements.

* * * * *